United States Patent
Reynolds et al.

(10) Patent No.: US 10,666,719 B2
(45) Date of Patent: *May 26, 2020

(54) USING READ WEIGHT AFFINITIES TO OPTIMIZE THE READING OF BLOCK CACHE DATA

(71) Applicant: GitHub, Inc., San Francisco, CA (US)

(72) Inventors: Patrick Reynolds, Pensacola, FL (US); Russell Belfer, San Mateo, CA (US)

(73) Assignee: GITHUB, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,814

(22) Filed: Nov. 27, 2018

(65) Prior Publication Data
US 2019/0238630 A1    Aug. 1, 2019

Related U.S. Application Data

(63) Continuation of application No. 15/135,834, filed on Apr. 22, 2016, now Pat. No. 10,187,457.

(60) Provisional application No. 62/285,016, filed on Dec. 23, 2015.

(51) Int. Cl.
| | |
|---|---|
| *G06F 11/00* | (2006.01) |
| *H04L 29/08* | (2006.01) |
| *G06F 11/10* | (2006.01) |
| *G06F 11/14* | (2006.01) |
| *G06F 11/07* | (2006.01) |

(52) U.S. Cl.
CPC ........ *H04L 67/1004* (2013.01); *G06F 11/073* (2013.01); *G06F 11/0709* (2013.01); *G06F 11/079* (2013.01); *G06F 11/0757* (2013.01); *G06F 11/1004* (2013.01); *G06F 11/14* (2013.01)

(58) Field of Classification Search
CPC ............. H04L 41/5003; H04L 41/5009; H04L 41/5067; H04L 41/5083; H04L 43/16; H04L 43/18; H04L 67/1015; H04L 67/1025; H04L 67/327; G06F 9/505
See application file for complete search history.

(56) References Cited

U.S. PATENT DOCUMENTS

| | | | | |
|---|---|---|---|---|
| 5,881,238 A * | 3/1999 | Aman | ..................... | G06F 9/505 709/226 |
| 6,167,427 A * | 12/2000 | Rabinovich | ......... | H04L 67/1002 707/999.202 |
| 6,351,775 B1 * | 2/2002 | Yu | ....................... | H04L 67/1008 709/238 |
| 7,080,378 B1 * | 7/2006 | Noland | ................. | G06F 9/5083 709/224 |
| 7,475,157 B1 * | 1/2009 | Tormasov | ........... | H04L 67/1008 709/227 |
| 7,860,097 B1 * | 12/2010 | Lovett | ................. | H04L 12/4641 370/392 |

(Continued)

*Primary Examiner* — Bryce P Bonzo
*Assistant Examiner* — Jeison C Arcos
(74) *Attorney, Agent, or Firm* — Workman Nydegger

(57) ABSTRACT

A system for directing reads includes an input interface and a processor. The input interface is to receive a request to read from a plurality of servers. The processor is to determine a set of weights for a set of healthy servers of the plurality of servers and determine a server to receive the request based at least in part on the set of weights.

20 Claims, 11 Drawing Sheets

(56) References Cited

U.S. PATENT DOCUMENTS

| | | | |
|---|---|---|---|
| 8,539,080 B1* | 9/2013 | Uluderya | H04L 45/70 709/226 |
| 2004/0044744 A1* | 3/2004 | Grosner | H04L 29/06 709/217 |
| 2005/0033809 A1* | 2/2005 | McCarthy | G06F 9/505 709/205 |
| 2007/0022426 A1* | 1/2007 | Steinder | G06F 9/505 718/104 |
| 2008/0043617 A1* | 2/2008 | Schekochikhin | H04L 43/0817 370/229 |
| 2008/0043622 A1* | 2/2008 | Kamath | H04L 43/08 370/235 |
| 2008/0189350 A1* | 8/2008 | Vasa | H04L 41/5003 709/201 |
| 2010/0131946 A1* | 5/2010 | Degaonkar | G06F 11/2025 718/1 |
| 2010/0146517 A1* | 6/2010 | Aschen | H04L 43/0852 718/105 |
| 2011/0131288 A1* | 6/2011 | Patel | G06F 9/505 709/208 |
| 2011/0149737 A1* | 6/2011 | Muthiah | G06F 9/5011 370/235 |
| 2013/0162444 A1* | 6/2013 | Boulanger | H04Q 9/00 340/870.03 |
| 2013/0212264 A1* | 8/2013 | Troppens | H04L 61/1511 709/224 |
| 2015/0032691 A1* | 1/2015 | Hall | H04L 29/06 707/610 |
| 2015/0113162 A1* | 4/2015 | Chan | H04L 67/1008 709/238 |
| 2016/0224392 A1* | 8/2016 | Clarke | G06F 9/505 |

* cited by examiner

|  | Server 1 Weight | Server 2 Weight | Server 3 Weight |
|---|---|---|---|
| Repository 1 | 1 | 0 | 0 |
| Repository 2 | 0 | 1 | 0 |
| Repository 3 | 0.33 | 0.33 | 0.33 |
| Repository 4 | 1 | 0 | 0 |
| Repository 5 | 0 | 1 | 0 |
| Repository 6 | 0 | 0 | 1 |
| Repository 7 | 1 | 0 | 0 |
| Repository 8 | 0.33 | 0.33 | 0.33 |
| Repository 9 | 0 | 0 | 1 |
| Repository 10 | 1 | 0 | 0 |
| Repository 11 | 0 | 1 | 0 |
| Repository 12 | 0 | 0 | 1 |

Fig. 4

USING READ WEIGHT AFFINITIES TO OPTIMIZE THE READING OF BLOCK CACHE DATA

CROSS REFERENCE TO OTHER APPLICATIONS

This application is a continuation of co-pending U.S. patent application Ser. No. 15/135,834, entitled USING READ WEIGHT AFFINITIES TO OPTIMIZE THE READING OF BLOCK CACHE DATA filed Apr. 22, 2016 which is incorporated herein by reference for all purposes, which claims priority to U.S. Provisional Patent Application No. 62/285,016, entitled USING READ WEIGHT AFFINITIES TO OPTIMIZE THE READING OF BLOCK CACHE DATA filed Dec. 23, 2015, which is incorporated herein by reference for all purposes.

BACKGROUND OF THE INVENTION

A system for storing software comprises an online software repository hosting code for software developers. The online software repository assists with project sharing, collaboration, version control, etc. As the system is used by an increasingly large number of software developers, the system may add additional online software repository servers to distribute the load. When a developer requests information from the online software repository, the information is read from any one of the online software repository servers and provided to the developer. However, reading from only one server, or from all servers equally, can perform inefficiently.

BRIEF DESCRIPTION OF THE DRAWINGS

Various embodiments of the invention are disclosed in the following detailed description and the accompanying drawings.

FIG. 4 is a diagram illustrating an embodiment of a weight table.

DETAILED DESCRIPTION

Figure 1:
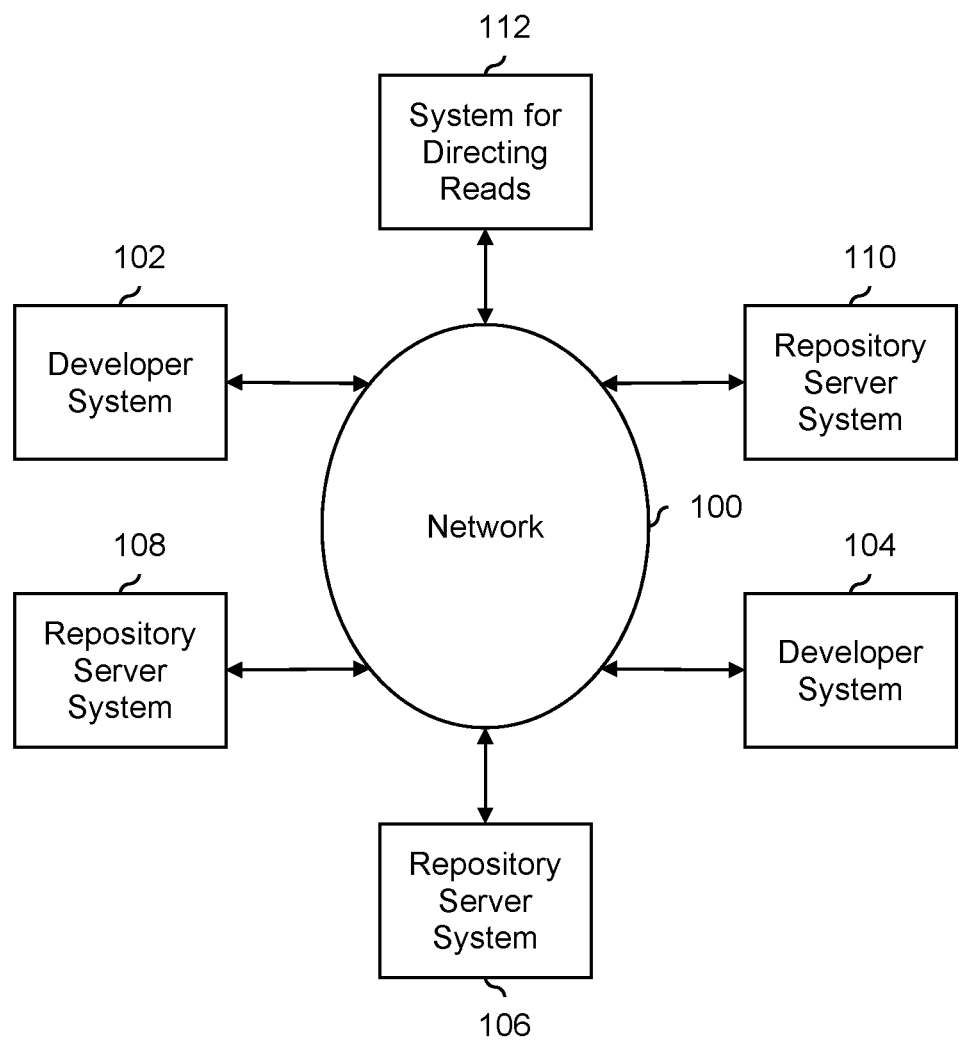
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for directing reads comprises an input interface to receive a request to read from a plurality of servers and a processor to determine a set of weights for a set of healthy servers of the plurality of servers and to determine a server to receive the request based at least in part on the set of weights. In some embodiments, the system for directing reads additionally comprises a memory coupled to the processor and configured to provide the processor with instructions.

In some embodiments, a system for directing reads comprises an intermediate system for directing read requests from a developer repository system to a repository server system of a set of repository server systems. The developer repository system comprises a developer version of a software repository maintained on the repository server systems. The developer version comprises a local copy of the software repository as well as any modifications to the software repository made by the developer. A software repository comprises a set of software code (e.g., comprising a software project). The repository server system hosts the project and assists the developer, for example, with collaboration, project sharing, or version control. When a developer issues a command comprising a read command from the repository server system, the system for directing reads determines a repository server system of the set of repository server systems to read from. The system for directing reads first checks the desired repository to read on each of the repository server systems and confirms that the checksum for the repository is correct. In the event that any repository server systems have an incorrect checksum for the repository, they are indicated for repair and disqualified for the read. The system for directing reads then determines the repository server system to read from based on a set of weights and a random number.

In some embodiments, the repository server system weights are initially chosen to have a total weight equal to one. In the event that any repository server system is disqualified because of an incorrect checksum, the total weight is then less than one, so the server weights are then scaled to add to one again (e.g., each server weight is multiplied by $$\frac{1}{1-W_D},$$

where $W_D$ is the total disqualified server weight).

In some embodiments, a random number is chosen between 0 and the sum of the weights of all repository servers with correct checksums. The random number is used to select the corresponding server (e.g., the servers are arranged on a number line from zero to the sum of the weights of all servers with correct checksums, each occupying a total distance on the line corresponding to its weight; the server at the position of the chosen random number is selected).

In some embodiments, the optimal selection of which software repository server to read from depends on overall load on the system and the pattern of traffic on each individual software repository.

In some embodiments, it is desirable to have all reads associated with a given repository come from a single repository server system. A repository server system includes a block cache that stores a quickly accessible copy of the most recently retrieved data. In the event that all reads of a given file come from a single repository server system, the file only needs to be stored in the block cache of that repository server system and not in the block cache of the other repository server systems. However, in some embodiments, it is desirable to have reads associated with a given repository distributed across a set of repository server systems. For repositories that are frequently accessed, performance can be improved by distributing the requests across multiple servers (e.g., two servers, five servers, all available servers, etc.). The added cost of storing the repository in the block cache of the multiple servers is justified by the performance increase. Typically, the server weights associated with a repository are initially set to be one for a single server and zero for all other servers. Access to the servers for each repository is monitored, and in the event server load for a repository increases above a threshold, the weights associated with that repository are modified to distribute the load (e.g., by decreasing the weight associated with the server and increasing the weight associated with one or more other servers).

In some embodiments, a server stores a local copy of data to memory that has recently been read from disk. In the event another request comes in for the same data, it can be accessed more quickly from memory than from the disk. In a system with multiple servers comprising replicas of one another, each server will have an identical copy of the server data storage. When the system receives a read request, it has to determine how to direct the request (e.g., which of the multiple servers to send it to). In some embodiments, the requests are directed to a next server in a round-robin fashion, however, this would result in data from every repository to compete for space in the block cache for each server. This would mean that the block cache memory is required to be N times larger than it would be in the event that data from each portion of the server memory is only requested from a single server, wherein N is the number of servers each repository is stored on. However, requests to the server also consume server resources, including processor time, network capacity, and disk throughput. In the event a given portion of server data receives a great deal of requests, it is preferable to divide the requests across multiple servers, to reduce the total load on each server processor. In the example shown, the servers are weighed. For some data, one server is weighted 100%, indicating that all read requests for that data go to a single server. Different data favors a different server. Data that is heavily used can have its associated server weight distributed between multiple servers (e.g., evenly, scaled according to server performance, etc.).

FIG. 1 is a block diagram illustrating an embodiment of a network system. In some embodiments, the network system of FIG. 1 comprises a system for revision control. In some embodiments, the network system of FIG. 1 provides communication between any appropriate number of software developers and a set of repository server systems. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, developer system 102 and developer system 104 comprise systems for use by a software developer while developing software. In various embodiments, there are 1, 6, 22, 122, 1059, or any other appropriate number of developer systems communicating with network 100. In some embodiments, a developer system comprises a processor and a memory. Repository server system 106, repository server system 108, and repository server system 110 comprise server systems for storing data. In various embodiments, there are 1, 2, 3, 4, 5, 7, 9, 14, 22, or any other appropriate number of repository server systems. In some embodiments, a repository server system comprises a processor and a memory. In some embodiments, repository server system 106, repository server system 108, and repository server system 110 comprise server systems for storing code. In various embodiments, repository server system 106, repository server system 108, and repository server system 110 comprise systems for storing software, for enabling collaboration, for providing version control, for publishing software, or for any other appropriate purpose. In some embodiments, a developer system downloads a software repository from a repository server system. In some embodiments, a developer system uploads software modifications to a software repository on a repository server system. In some embodiments, each repository system stores the same software. In some embodiments, a developer system communicates with one repository server system to store software changes, and any changes made to the repository server system are copied to the other repository systems. In the example shown, system for directing reads 112 comprises a system for receiving a request to read data from a repository server and determining a repository server to read the data from. In some embodiments, system for directing reads 112 is implemented using a processor.

Figure 2:
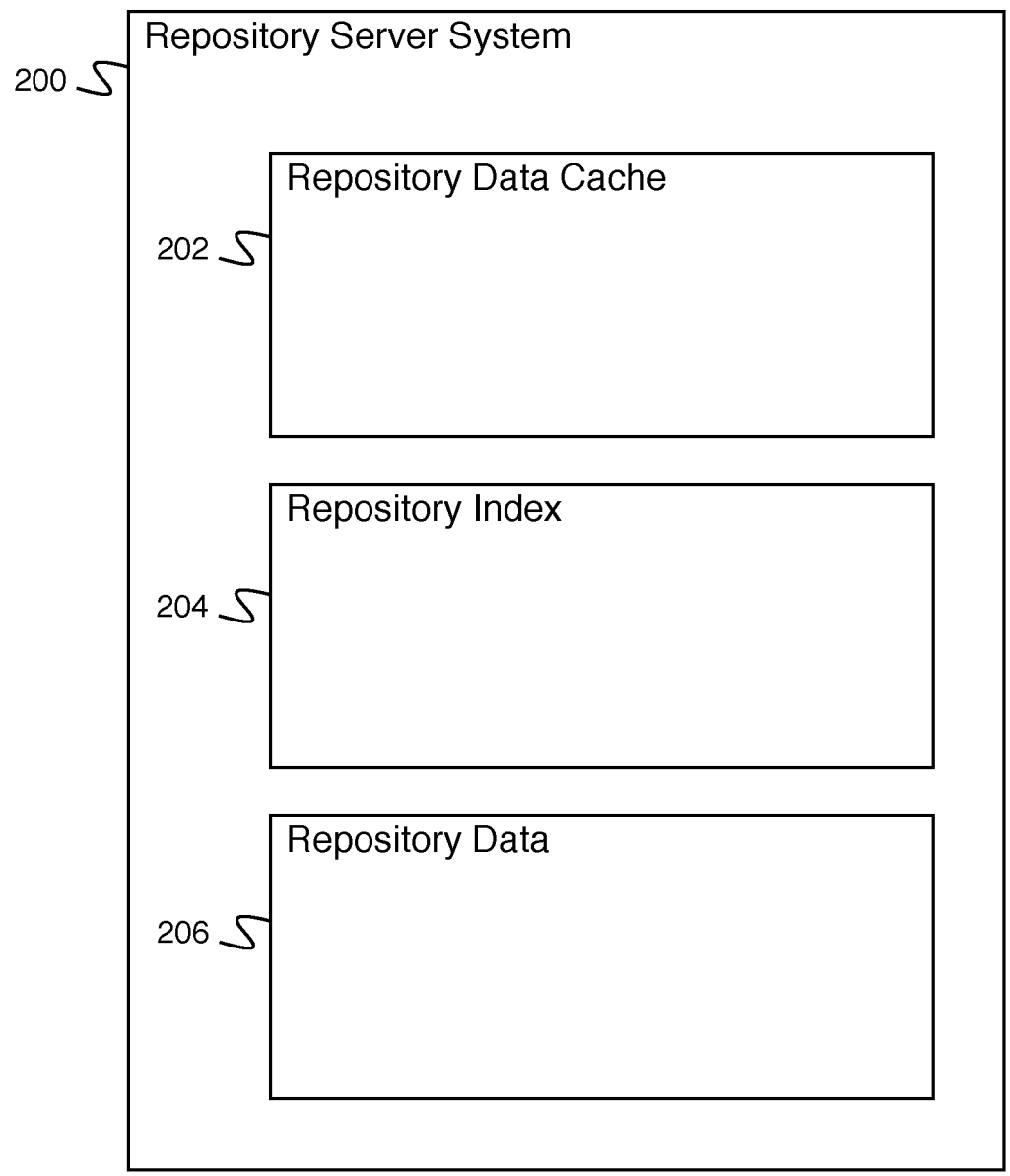
FIG. 2 is a block diagram illustrating an embodiment of a repository server system.

FIG. 2 is a block diagram illustrating an embodiment of a repository server system. In various embodiments, repository system 200 of FIG. 2 comprises repository server system 106 of FIG. 1, repository server system 108 of FIG. 1, or repository server system 110 of FIG. 1. In the example shown, repository server system 200 comprises repository data cache 202. In some embodiments, repository data cache 202 comprises a data cache for storing recently requested data. In some embodiments, repository data cache 202 is stored in random-access memory. In some embodiments, when data is requested from repository server system 200, repository server system 200 checks repository data 202 cache to see whether the data is stored there. In the event the data is stored in repository data cache 202, the data is provided from repository data cache 202 to the data requestor. In the event the data is not stored in repository data cache 202, the data is requested from repository index 204. Repository index 204 comprises an index of repositories stored by repository server system 200. Each repository comprises a set of data chunks. Locations of the data chunks within repository data 206 are stored by repository index 204. When data is requested from repository index 204, it determines the data chunk or chunks comprising the requested data, requests the data chunk or chunks from repository data 206, assembles the requested data, and provides the data to the data requestor. In some embodiments, repository data 206 comprises a disk memory. In some embodiments, the requested data is additionally stored in repository data cache 202 in order to speed data access the next time the data is requested. In some embodiments, in the event repository data cache is full, data is discarded from repository data cache 202 to make room for the new data. In various embodiments, the oldest data is discarded, the least recently used data is discarded, the least used data is discarded, or any other appropriate data is discarded. In some embodiments, repository data cache 202 is implemented using a processor. In some embodiments, repository index 204 is implemented using a processor. In some embodiments, repository data 206 is implemented using a processor. In various embodiments, the elements of repository server system are each implemented using their own processor, are all implemented using a single processor, or are implemented combined on a set of processors in any other appropriate way. In some embodiments, repository server system 200 additionally comprises an interface for communicating (e.g., with a network, e.g., network 100 of FIG. 1). In some embodiments, repository server system 200 additionally comprises a memory. In some embodiments, the memory is coupled to a processor and configured to provide a processor with instructions. In various embodiments, the memory comprises a magnetic memory, an optical memory, a solid-state memory, a flash memory, a non-volatile memory, a read-only memory, a tape memory, a disc memory, or any other appropriate memory.

Figure 3:
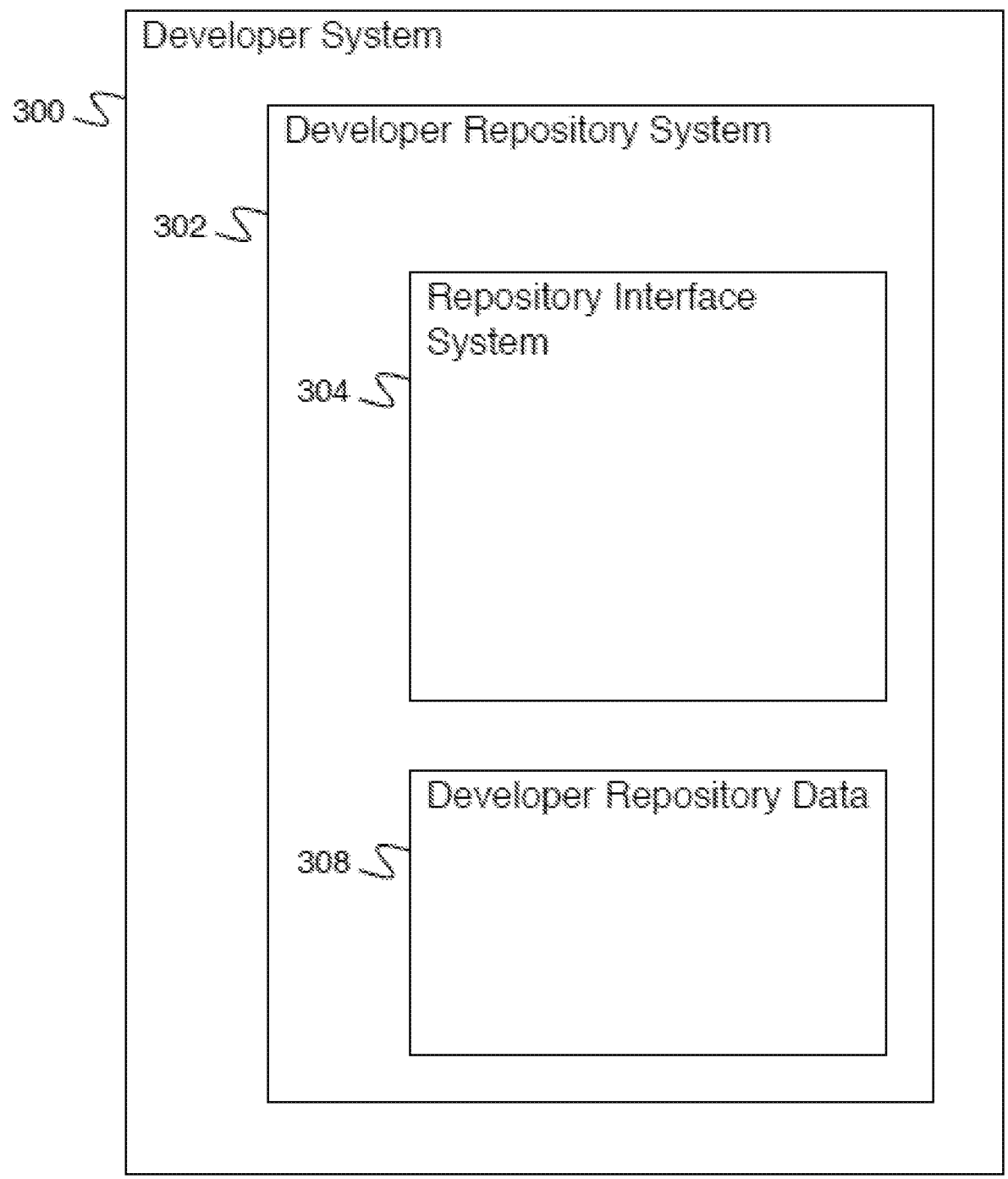
FIG. 3 is a block diagram illustrating an embodiment of a developer system.

FIG. 3 is a block diagram illustrating an embodiment of a developer system. In some embodiments, developer system 300 comprises developer system 102 of FIG. 1 or developer system 104 of FIG. 1. In the example shown, developer system 300 comprises a system for a developer for working with software. Developer system 300 comprises developer repository system 302. Developer repository system 302 comprises a system for a developer to work with repository data. In various embodiments, developer repository system 302 comprises a system for downloading data from a repository server, for storing changes to data, for uploading changes to data, for merging changes to data, for storing a local copy of a software repository, or for any other appropriate purpose. In some embodiments, developer system 300 additionally comprises developer tools (e.g., software compilers, software development environment tools, software development research tools, debugging tools, software measurement tools, etc.). In the example shown, developer repository system 302 comprises repository interface system 304 and developer repository data 308. In some embodiments, developer repository data 308 comprises repository data (e.g., a local copy of repository data, developer changes to repository data, etc.). Repository interface system 304 comprises a system for communicating with one or more repository servers. In various embodiments, repository interface system 304 comprises a system for downloading repository data, for uploading repository data, or for any other appropriate repository interface purpose. In the example shown, repository interface system 304 communicates with a system for directing reads (e.g., system for directing reads 112 of FIG. 1). In some embodiments, repository interface system 304 is implemented using a processor. In some embodiments, developer repository data 308 is implemented using a processor. In some embodiments, developer repository system 302 is implemented using a processor. In various embodiments, the elements of developer system 300 are implemented on any appropriate number of processors, combined in any appropriate way. In some embodiments, developer system 300 additionally comprises an interface for communicating (e.g., with a network, e.g., network 100 of FIG. 1). In some embodiments, repository server system 300 additionally comprises a memory. In some embodiments, the memory is coupled to a processor and configured to provide a processor with instructions. In various embodiments, the memory comprises a magnetic memory, an optical memory, a solid-state memory, a flash memory, a non-volatile memory, a read-only memory, a tape memory, a disc memory, or any other appropriate memory.

FIG. 4 is a diagram illustrating an embodiment of a weight table. In some embodiments, the weight table of FIG. 4 comprises a weight table used by a system for directing reads (e.g., system for directing reads 306 of FIG. 3) for storing weights associated with each server of a set of servers for each repository of a set of repositories. In some embodiments, a weight associated with a server for a repository comprises an indication of the fractional chance the system for directing reads will decide to perform a read of the repository from the server. In the example shown, for all repositories shown except for repository 3 and repository 8, only one server associated with each repository comprises a nonzero weight. In the event only one server associated with a repository comprises a nonzero weight, all reads for that repository come from the server with nonzero weight. When all reads for a repository come from a single server, only that server caches the repository in its block cache. In the example shown, for repository 3 and repository 8, each server comprises an equal weight. When reads for a repository are distributed between all available servers, a heavy load can be more easily dealt with without overloading any individual server. In the example shown, repositories except for repository 3 and repository 8 comprise repositories with typical usage, and repository 3 and repository 8 comprise repositories with heavy usage. In some embodiments, other weight distributions are possible (e.g., other than all weight on one server or weight evenly distributed between all servers). In some embodiments, in the event a repository comprises moderate but above average usage, its weight is distributed between a subset of the servers (e.g., between two servers). In some embodiments, in the event the performance of a server is substantially above the performance of the other servers, it takes a disproportionate share of the load (e.g., weights distributed 0.5 for server 1, 0.25 for server 2, and 0.25 for server 3).

Figure 5:
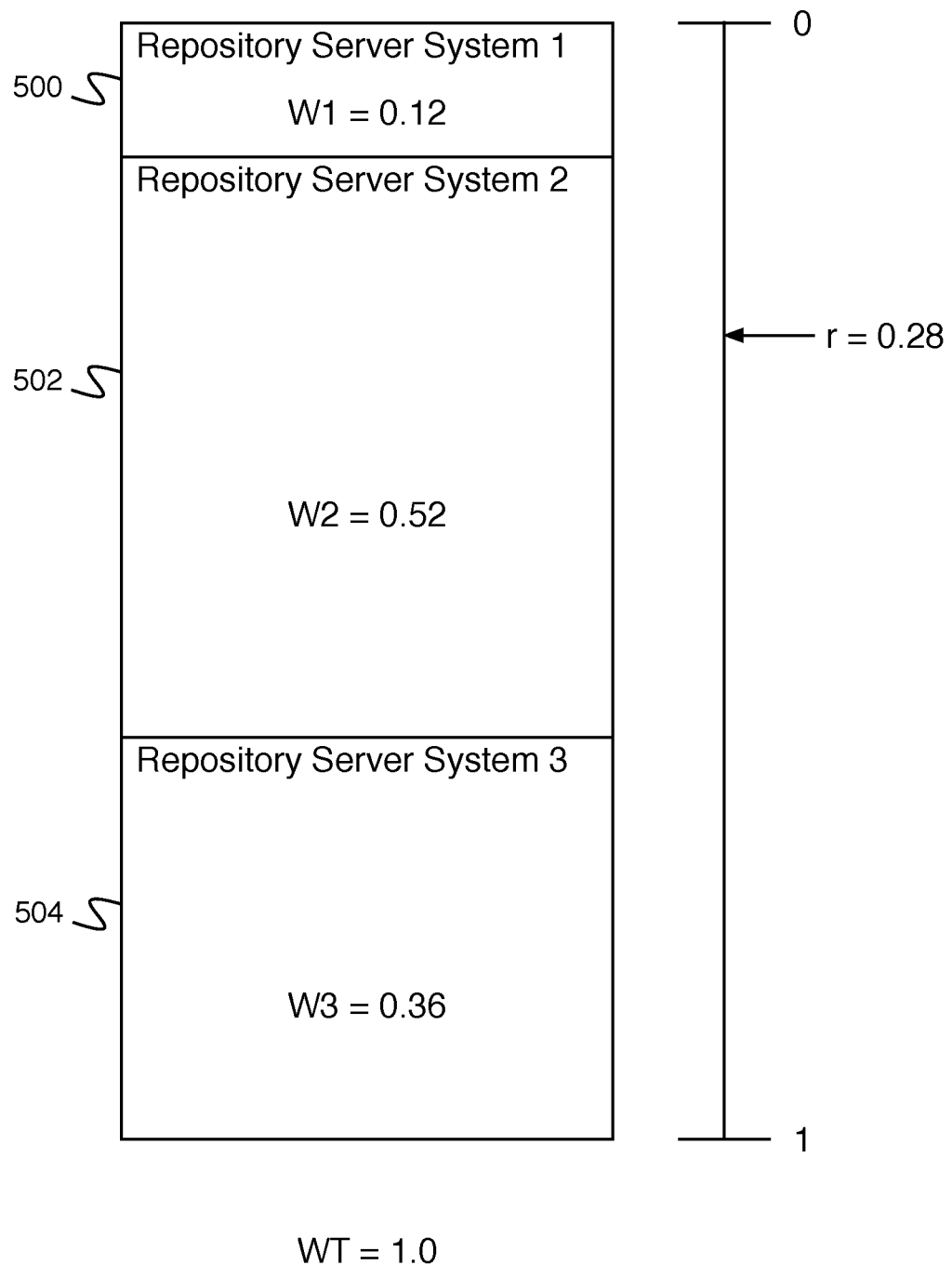
FIG. 5 is a flow diagram illustrating an embodiment of a random choice of a server.

FIG. 5 is a flow diagram illustrating an embodiment of a random choice of a server. In some embodiments, the diagram of FIG. 5 illustrates a random choice of a server based on a selection of a random number and a set of weights. In some embodiments, the diagram of FIG. 5 illustrates a random choice of a server performed by a system for directing reads (e.g., system for directing reads 306 of FIG. 3). In the example shown, weight 500 associated with repository server system 1 comprises a weight of 0.12. Weight 502 associated with repository server system 2 comprises 0.52. Weight 504 associated with repository server system 3 comprises 0.36. In some embodiments, weight 500, weight 502, and weight 504 are chosen to distribute the load of a heavily used repository between the three servers, and the weights are scaled according to the relative performance of the servers (e.g., server 3 has 3 times the performance of server 1, and thus receives three times the load). A random number is chosen to determine which server to direct a particular read request to. In the event the random number comprises a number greater than or equal to 0 and less than 0.12, the read request is directed to repository server system 1. In the event the random number comprises a number greater than or equal to 0.12 and less than 0.64, the read request is directed to repository server system 2. In the event the random number comprises a number greater than or equal to 0.64 and less than 1, the read request is directed to repository server system 3. In the example shown, a random number equal to 0.28 is chosen, indicating that repository server system 2 is chosen.

Figure 6:
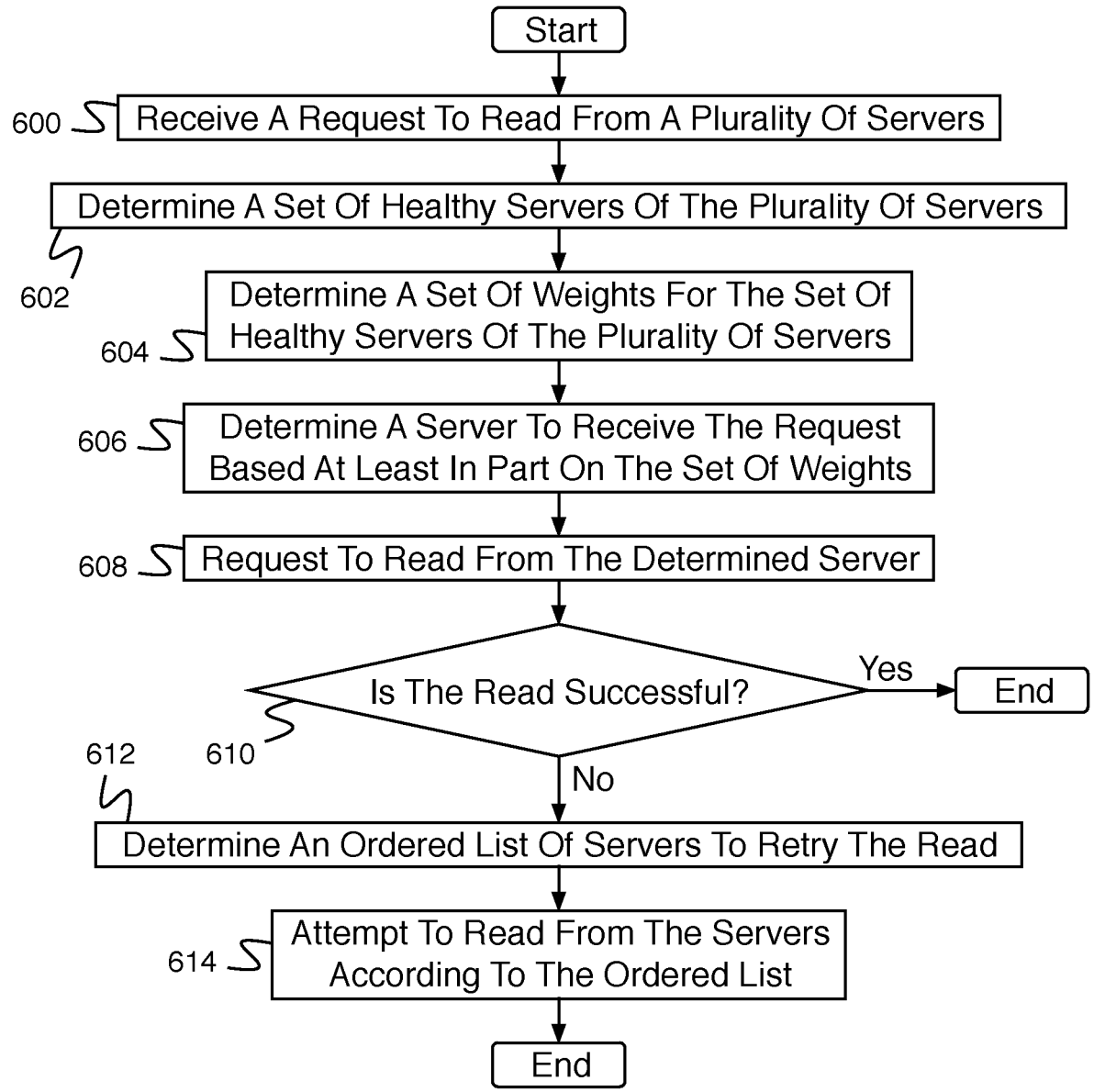
FIG. 6 is a flow diagram illustrating an embodiment of a process for directing reads.

FIG. 6 is a flow diagram illustrating an embodiment of a process for directing reads. In some embodiments, the process of FIG. 6 is executed by system for directing reads 306 of FIG. 3. In the example shown, in 600, a request is received to read from a plurality of servers. In some embodiments, the request to read comprises a request to read a repository from a repository server system. In 602, a set of healthy servers of the plurality of servers is determined. In some embodiments, the set of healthy servers comprises the set of servers with correct checksums. In 604, a set of weights for the set of healthy servers of the plurality of servers is determined. In some embodiments, determining the set of weights comprises looking up the set of weights in a weight table. In 606, a server to receive the request is determined based at least in part on the set of weights. In some embodiments, determining the server comprises determining a random number. In some embodiments, in the event one or more servers of the plurality of servers is determined to not be healthy, the set of weights from the weight table is scaled. In some embodiments, scaling the set of weights from the weight table comprises normalizing the sum of the weights from the weight table. In 608, the process requests to read from the determined server. In some embodiments, a response to the request is received. In 610, it is determined whether the read is successful. In some embodiments, it is determined that the read is successful in the event that a response to the request is received within a predetermined period of time. In some embodiments, it is determined that the read is successful in the event a read success response is received. In the example shown, in the event it is determined that the read is successful, the process ends. In the event it is determined that the read is not successful, control passes to 612. In 612, an ordered list of servers is determined to retry the read. In some embodiments, the ordered list of servers comprises an ordered list of the set of healthy servers. In some embodiments, the ordered list of servers does not include the initially determined server (e.g., the server determined to receive the request in 606). In 614, the process attempts to read from the servers according to the ordered list.

In some embodiments, the ordered list of servers is determined early in the process (e.g., in 606) such that the first server the read is requested from is from the top of the list and subsequent reads, in the event of a failure, are from subsequent servers on the list.

Figure 7:
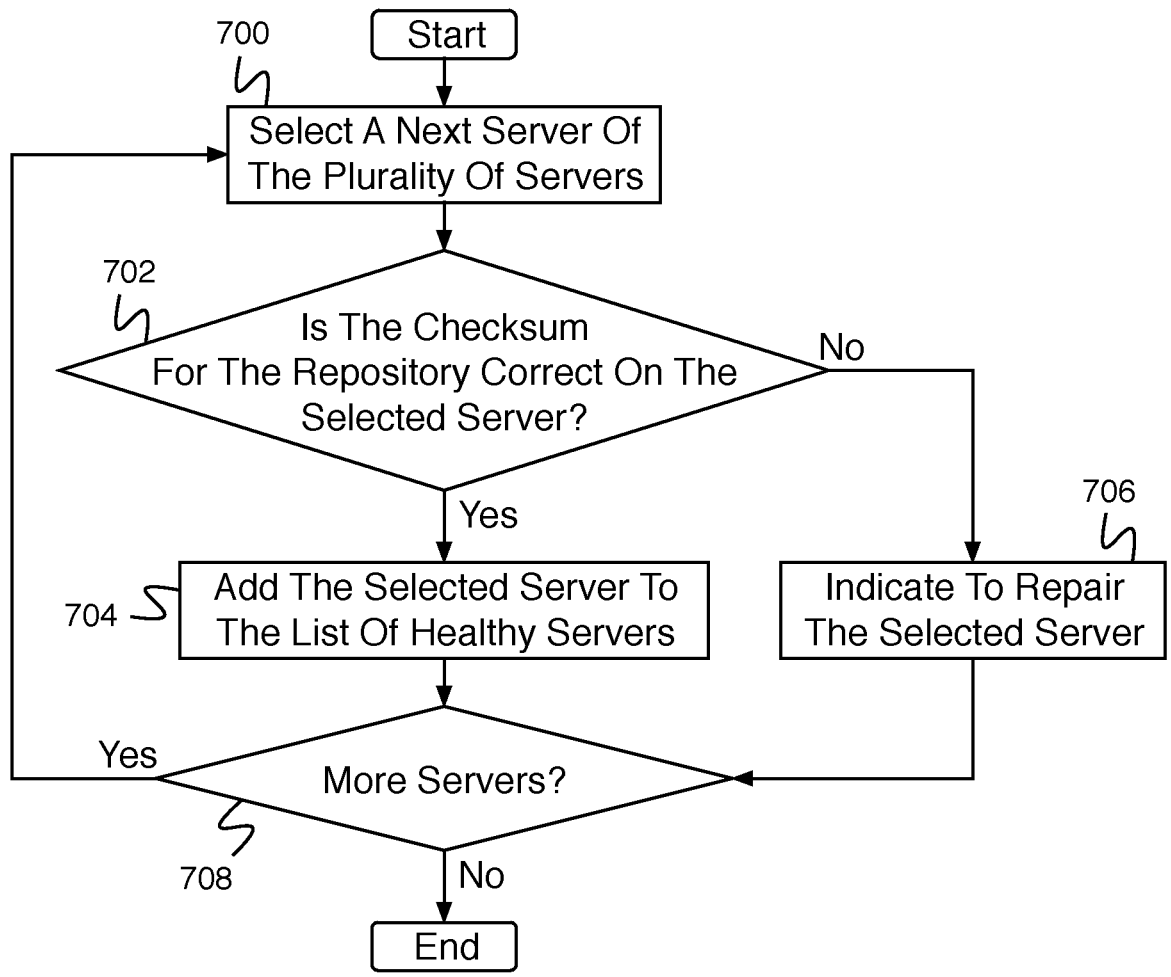
FIG. 7 is a flow diagram illustrating an embodiment of a process for determining a set of healthy servers of a plurality of servers.

FIG. 7 is a flow diagram illustrating an embodiment of a process for determining a set of healthy servers of a plurality of servers. In some embodiments, the process of FIG. 7 implements 602 of FIG. 6. In the example shown, in 700, a next server of the plurality of servers is selected. In some embodiments, the next server comprises the first server. In 702, it is determined whether the checksum for the repository is correct on the selected server. In the event it is determined that the checksum for the repository is correct on the selected server control passes to 704. In 704, the selected server is added to the list of healthy servers. Control then passes to 708. In the event it is determined in 702 that the checksum for the repository is not correct on the selected server, control passes to 706. In 706, the process indicates to repair the selected server. In various embodiments, indicating to repair the selected server comprises adding an indication to a list to repair the selected server, providing an indication to a repair process to repair the selected server, providing an indication to the selected server that it is in need of repair, directly repairing the selected server, or indicating to repair the selected server in any other appropriate way. Control then passes to 708. In 708, it is determined whether there are more servers. In the event it is determined that there are more servers, control passes to 700. In the event it is determined that there are not more servers, the process ends.

Figure 8:
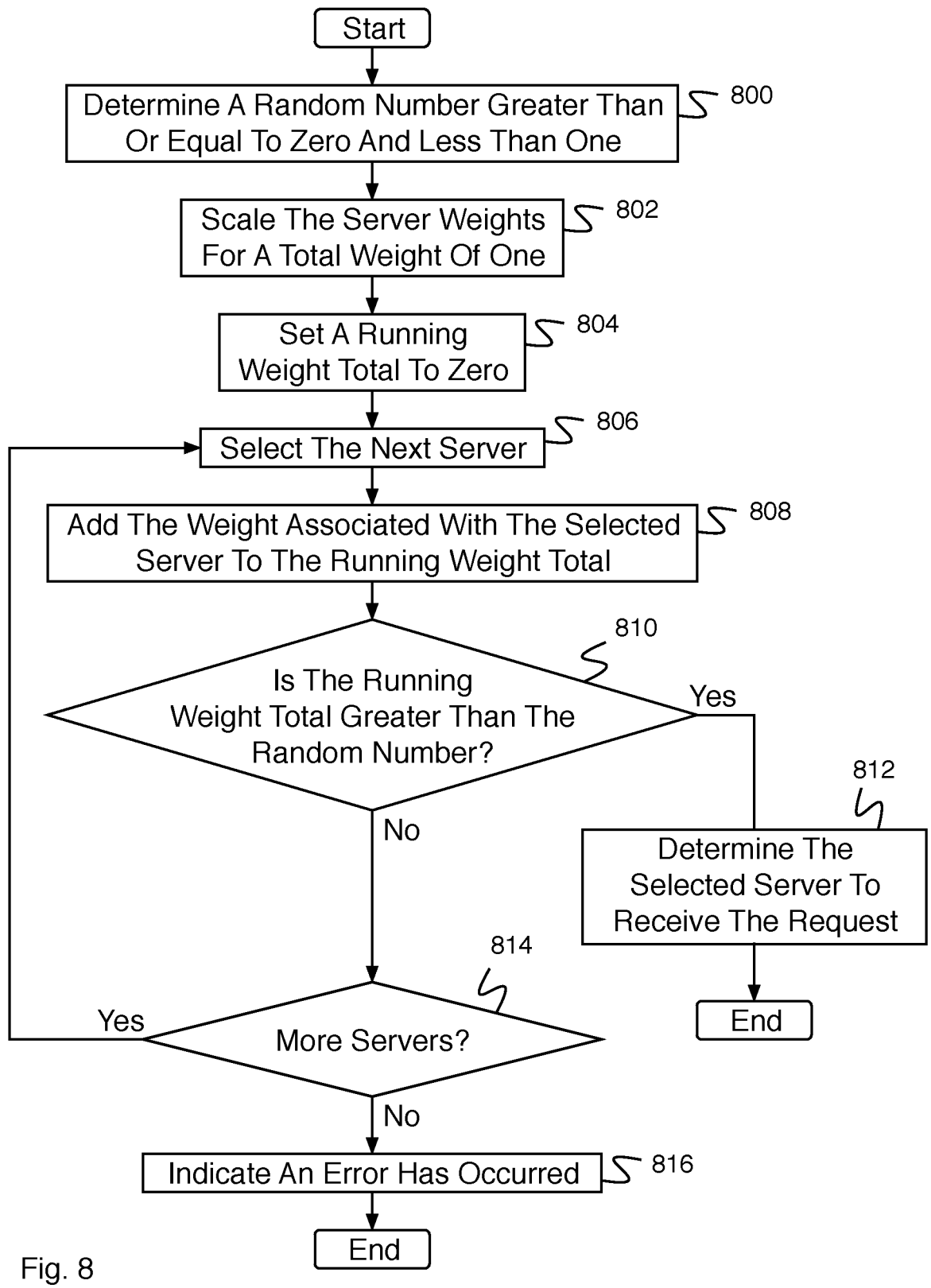
FIG. 8 is a flow diagram illustrating an embodiment of a process for determining a server to receive a request based at least in part on a set of weights.

FIG. 8 is a flow diagram illustrating an embodiment of a process for determining a server to receive a request based at least in part on a set of weights. In some embodiments, the process of FIG. 8 implements 606 of FIG. 6. In the example shown, in 800, a random number greater than or equal to zero and less than one is determined. In 802, the server weights are scaled for a total of one. In some embodiments, scaling the server weights for a total weight of one comprises multiplying each server weight by a value such that the total of the weights sums to one. In some embodiments, the server weights as received from a weight table always sum to one, and scaling the server weights is only necessary in the event a server of the set of servers is determined to not be healthy. In some embodiments, server weights are not scaled. In 804, a running weight total is set to zero. In 806, the next server (e.g., of the set of healthy servers) is selected. In some embodiments, the next server comprises the first server. In 808, the weight associated with the selected server is added to the running weight total. In 810, it is determined whether the running weight total is greater than the random number. In the event it is determined that the running weight total is greater than the random number, control passes to 812. In 812, the selected server is determined to receive the request, and the process ends. In the event it is determined in 810 that the running weight total is not greater than the random number, control passes to 814. In 814, it is determined whether there are more servers (e.g., more servers of the set of healthy servers). In the event it is determined that there are more servers, control passes to 806. In the event it is determined that there are not more servers, control passes to 816. When all servers have had their weight added to the running weight total, the running weight total should always equal one. The random number is chosen to be less than one, so the process should never arrive at 816 (e.g., by the time there are no more servers, the determination of 810 should have been yes at some point). In 816, the process indicates an error has occurred, and the process ends.

Figure 9:
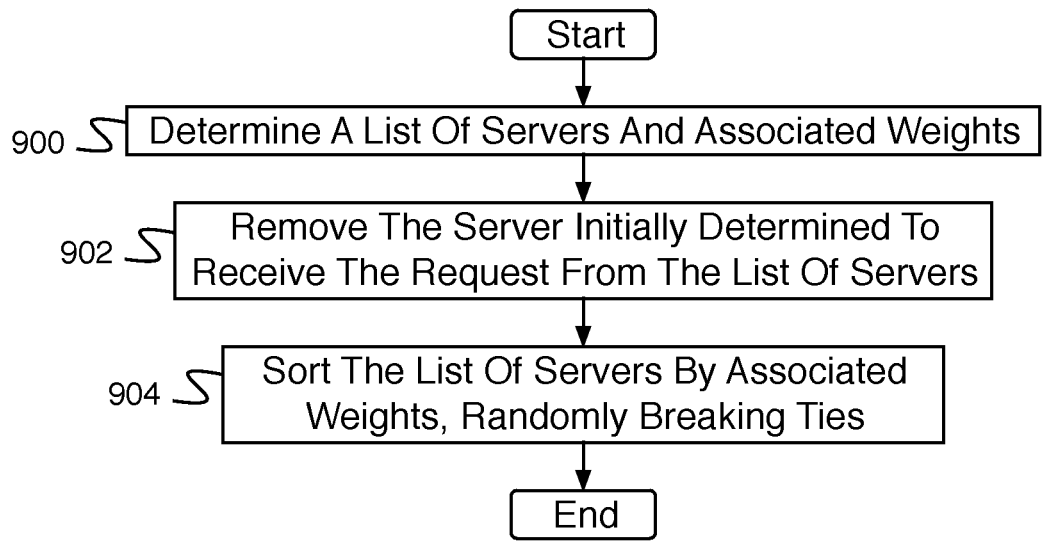
FIG. 9 is a flow diagram illustrating an embodiment of a process for determining an ordered list of servers to retry a read.

FIG. 9 is a flow diagram illustrating an embodiment of a process for determining an ordered list of servers to retry a read. In some embodiments, the process of FIG. 9 implements 612 of FIG. 6. In the example shown, in 900, a list of servers and associated weights is determined. In some embodiments, a list of servers and associated weights is determined by adding each server and its associated weight from a weight table to the list. In 902, the server initially determined to receive the request is removed from the list of servers. In 904, the list of servers is sorted by associated weights, randomly breaking ties. In some embodiments, servers with the highest weights are put at the beginning of the list and servers with the lowest weights are put at the end of the list.

Figure 10:
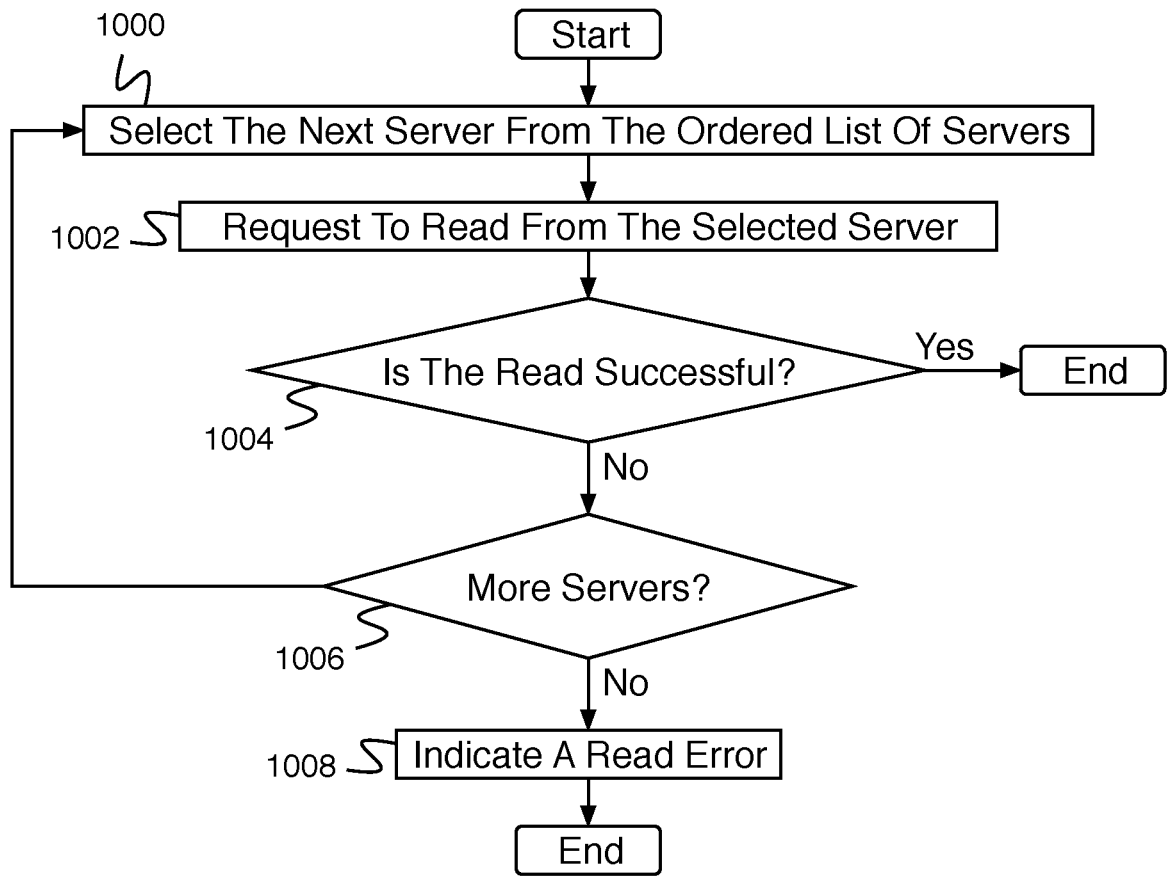
FIG. 10 is a flow diagram illustrating an embodiment of a process for attempting to read from the servers according to the ordered list.

FIG. 10 is a flow diagram illustrating an embodiment of a process for attempting to read from the servers according to the ordered list. In some embodiments, the process of FIG. 10 implements 614 of FIG. 6. In the example shown, in 1000, the next server from the ordered list of servers is selected. In some embodiments, the next server comprises the first server (e.g., the server with the highest weight). In 1002, the process requests to read from the selected server. In some embodiments, a response from the server is received. In 1004, it is determined whether the read is successful. In some embodiments, it is determined that the read is successful in the event that a response to the request is received within a predetermined period of time. In some embodiments, it is determined that the read is successful in the event a read success response is received. In the example shown, in the event it is determined that the read is successful, the process ends. In the event it is determined that the read is not successful, control passes to 1006. In 1006, it is determined whether there are more servers (e.g., more servers in the ordered list of servers. In the event it is determined that there are more servers, control passes to 1000. In the event it is determined that there are not more servers (e.g., all servers have been attempted to read from and none have been successful), control passes to 1008. In 1008, a read error is indicated, and the process ends.

Figure 11:
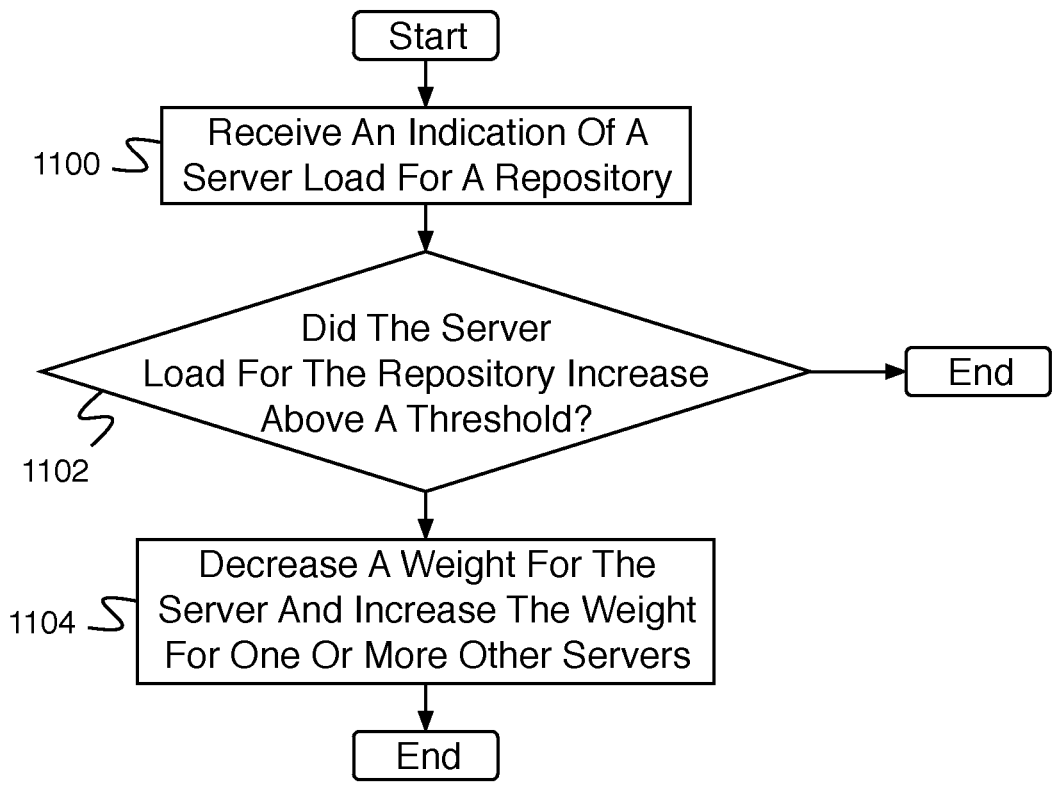
FIG. 11 is a flow diagram illustrating an embodiment of a process for adjusting weights.

FIG. 11 is a flow diagram illustrating an embodiment of a process for adjusting weights. In some embodiments, the process of FIG. 11 is executed by system for directing reads 306 of FIG. 3. In the example shown, in 1100, an indication of a server load for a repository is received. In some embodiments, the indication of the server load for the repository comprises an indication of how much of the server capability is being used by accesses to the repository. In 1102, it is determined whether the server load for the repository increased above a threshold (e.g., since the previous time the server load was determined). In various embodiments, there is one threshold level (e.g., between normal use and heavy use, between acceptable use and unacceptable use, etc.), there are two threshold levels (e.g., separating normal use, high use, and very high use), there are 5 threshold levels (e.g., between a set of six different predetermined usage levels), or there are any other appropriate number of threshold levels. In the event it is determined in 1102 that the server load for the repository did not cross above a threshold, the process ends. In the event it is determined in 1102 that the server load for the repository increased above a threshold, control passes to 1104. In 1104, a weight for the server is decreased and the weight for one or more other servers is increased. In some embodiments, decreasing the weight for the server and increasing the weight for one or more other servers comprises spreading the weight previously associated with the server evenly across two servers, across three servers, across all available servers, etc. In some embodiments, decreasing the weight for the server and increasing the weight for one or more other servers comprises increasing a number of servers with non-zero weight. In some embodiments, decreasing the weight for the server and increasing the weight for one or more other servers comprises modifying server weights based at least in part on a server performance.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for directing reads, comprising:
   at least one processor; and
   one or more storage device having stored computer-executable instructions that are executable by the at least one processor to cause the system to perform a method that includes:
      receiving, from a requesting system via a computer network, a request to read data, the data being stored at a plurality of servers in the computer network, each server also including an assigned weight;
      determining a set of healthy servers from the plurality of servers; for any server in the plurality of servers excluded from the set of healthy servers, modifying the assigned weight for each server in the set of healthy servers based on the assigned weight of that server being excluded from the set of healthy servers;
      determining a server of the set of healthy servers to receive the request based at least in part on the assigned weights of the set of healthy servers; and
      directing the request to a selected server in the set of healthy servers based on the assigned weights of the set of healthy servers, wherein the requesting system is configured to read the data from the selected server, the selected server having a repository data cache and a repository index, the repository data cache being a faster access point for accessing the data than from disk storage on the server.

2. The system of claim 1,
   wherein the data is stored in the repository data cache when the data was previously requested from the selected server recently than different data that was requested from the selected server.

3. the system of claim 2,
   wherein the data is stored in both the repository data cache as well as on the disk storage.

4. The system of claim 1,
   wherein the data is stored in the repository data cache when the data was previously requested from the selected server recently than different data that was requested from the selected server.

5. The system of claim 1,
   wherein each server in the set of healthy servers includes a copy of the data in a corresponding repository data cache of each server in the set of healthy servers.

6. The system of claim 1,
   wherein determining the set of healthy servers comprises verifying a checksum of each server in the set of healthy servers.

7. The system of claim 1,
   wherein the method further includes modifying the assigned weight of the selected server and each of one or more other servers in the set of healthy servers after determining a server load of the selected server is above a threshold server load.

8. The system of claim 5,
wherein the modifying the assigned weight of the selected server includes decreasing the assigned weight of the selected server and increasing the assigned weights of each of the one or more other servers in the set of healthy servers.

9. The system of claim 1,
wherein the method further includes modifying the assigned weight of the selected server and each of one or more other servers in the set of healthy servers after determining a server performance of the selected server.

10. The system of claim 1, wherein the method further includes
ordering the set of healthy servers for receiving the request in an event that the selected server is unable to satisfy the request and forwarding the request to a different server in the set of healthy servers upon the selected server failing to respond to the request within a predetermined period of time.

11. The method of claim 2, wherein the data is stored in both the repository data cache as well as on the disk storage.

12. The method of claim 1, wherein the data is stored in the repository data cache when the data was previously requested from the selected server recently than different data that was requested from the selected server.

13. The method of claim 1, wherein each server in the set of healthy servers includes a copy of the data in a corresponding repository data cache of each server in the set of healthy servers.

14. The method of claim 1, wherein determining the set of healthy servers comprises verifying a checksum of each server in the set of healthy servers.

15. The method of claim 1, wherein the method further includes modifying the assigned weight of the selected server and each of one or more other servers in the set of healthy servers after determining a server load of the selected server is above a threshold server load.

16. The method of claim 5, wherein the modifying the assigned weight of the selected server includes decreasing the assigned weight of the selected server and increasing the assigned weights of each of the one or more other servers in the set of healthy servers.

17. The method of claim 1, wherein the method further includes modifying the assigned weight of the selected server and each of one or more other servers in the set of healthy servers after determining a server performance of the selected server.

18. The method of claim 1, wherein the method further includes ordering the set of healthy servers for receiving the request in an event that the selected server is unable to satisfy the request and forwarding the request to a different server in the set of healthy servers upon the selected server failing to respond to the request within a predetermined period of time.

19. A method for providing a request for data to a selected server that is deterministically selected from a plurality of servers to receive the request, the method being implemented by a computing system and comprising:
receiving, from a requesting system via a computer network, a request to read data, the data being stored at each of the plurality of servers in the computer network, each server also including an assigned weight;
determining a set of healthy servers from the plurality of servers; for any server in the plurality of servers excluded from the set of healthy servers, modifying the assigned weight for each server in the set of healthy servers based on the assigned weight of that server being excluded from the set of healthy servers;
determining a server of the set of healthy servers to receive the request based at least in part on the assigned weights of the set of healthy servers; and
directing the request to a selected server in the set of healthy servers based on the assigned weights of the set of healthy servers, wherein the requesting system is configured to read the data from the selected server, the selected server having a repository data cache and a repository index, the repository data cache being a faster access point for accessing the data than from disk storage on the server.

20. The method of claim 19, wherein the data is stored in the repository data cache when the data was previously requested from the selected server recently than different data that was requested from the selected server.

* * * * *